(12) United States Patent
Patton et al.

(10) Patent No.: US 12,147,221 B2
(45) Date of Patent: Nov. 19, 2024

(54) FACILITY CONTROL AND COMMUNICATION SYSTEM

(71) Applicant: Transportation IP Holdings, LLC, Norwalk, CT (US)

(72) Inventors: Alexander Patton, Erie, PA (US); Scott Moore, Grove City, PA (US); Steve Weber, Grove City, PA (US); Gabe Shreckengost, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 207 days.

(21) Appl. No.: 17/346,953

(22) Filed: Jun. 14, 2021

(65) Prior Publication Data

US 2022/0397889 A1    Dec. 15, 2022

(51) Int. Cl.
*G05B 19/418* (2006.01)

(52) U.S. Cl.
CPC ............ *G05B 19/4185* (2013.01); *G05B 2219/31347* (2013.01)

(58) Field of Classification Search
CPC ............ G05B 19/4183; G05B 19/4185; G05B 2219/31282; G05B 2219/31347; G05B 24/00; G05B 19/00; G05B 11/00
See application file for complete search history.

(56) References Cited

U.S. PATENT DOCUMENTS

| | | | | |
|---|---|---|---|---|
| 5,572,643 A * | 11/1996 | Judson | ................. | G06F 16/957 715/236 |
| 5,594,910 A * | 1/1997 | Filepp | .................... | G06Q 30/02 712/28 |
| 6,724,403 B1 * | 4/2004 | Santoro | ............ | H04M 1/72427 715/765 |
| 2006/0002315 A1 * | 1/2006 | Theurer | .............. | H04L 67/1095 370/261 |
| 2006/0089978 A1 * | 4/2006 | Lee | ........................ | H04M 3/567 709/219 |
| 2007/0192128 A1 * | 8/2007 | Celestini | ................ | G06Q 10/06 705/35 |
| 2008/0270571 A1 * | 10/2008 | Walker | .................. | H04L 63/083 709/218 |
| 2012/0096127 A1 * | 4/2012 | Moore | .................. | H04L 67/104 709/219 |
| 2017/0026814 A1 * | 1/2017 | Naiki | ....................... | H04W 4/20 |
| 2018/0188702 A1 * | 7/2018 | Jiang | ....................... | G05B 15/02 |

\* cited by examiner

*Primary Examiner* — Kidest Bahta
(74) *Attorney, Agent, or Firm* — K&L Gates LLP

(57) ABSTRACT

A system is provided that may include plural data collector devices that may be configured to be communicatively coupled with each other in a network. Each of the data collector device may include one or more processors configured to receive display data from one or more data sources. The one or more processors may also be configured to communicate different portions of the display data to different respective network locations in the network. The one or more processors of each of the data collector devices may also be configured to control a respective display device of several display devices to alternate between displaying the different network locations at different times.

20 Claims, 10 Drawing Sheets

FIG. 7

| | Content ID | Title | Site | Type | URL |
|---|---|---|---|---|---|
| Actions | ▽ Contains | ▽ Contains | ▽ Contains | ▽ Contains | ▽ Contains |
| | 5fce89b9097c260009a77b94 | GEB 26-51 Plan | epm | pdf | https://opsvision.corp.wabtec.com/connect/epm/horizon/viewer/5fce89b9097c260009a77b94?monitor=true |
| | 5fca647d4e623a0009730ac3 | AC Blue Sheet | epm | pdf | https://opsvision.corp.wabtec.com/connect/epm/horizon/viewer/5fca647d4e623a0009730ac3?monitor=true |
| | 5fd0e8ebeea7d0008202678 | DC Armature | epm | webpage | https://opsvision.corp.wabtec.com/connect/epm/digital-cockpit/dc-armature?monitor=true |
| | 5fd0e69fbeea7d00082026ad | DC Coil | epm | webpage | https://opsvision.corp.wabtec.com/connect/epm/digital-cockpit/dc-coil?monitor=true |
| | 5fd0e6b0beea7d00082026e4 | DC Motor | epm | webpage | https://opsvision.corp.wabtec.com/connect/epm/digital-cockpit/dc-motor?monitor=true |
| | 5fd0e6c6beea7d0008202720 | Commutator | epm | webpage | https://opsvision.corp.wabtec.com/connect/epm/digital-cockpit/commutator?monitor=true |
| | 5fd0e6d9beea7d000820275b | DC Core Build | epm | webpage | https://opsvision.corp.wabtec.com/connect/epm/digital-cockpit/dc-core-build?monitor=true |
| | 5fd8d860d1a1f000091194b04 | Quality Alert-Bay A FA | epm | pdf | https://opsvision.corp.wabtec.com/connect/epm/horizon/viewer/5fd8d860d1a1f000091194b04?monitor=true |
| | 600eb79165505200084a4669 | AC Rotor Balance | epm | webpage | https://opsvision.corp.wabtec.com/connect/epm/digital-cockpit/ac-rotor-balance?monitor=true |
| | 600eb80f65505200084a46b1 | AC Stator VPI Clean | epm | webpage | https://opsvision.corp.wabtec.com/connect/epm/digital-cockpit/ac-stator-vpi-clean?monitor=true |
| | 600eb46ad65ea800091d855a | QA-00376 Proper Torque Marking | epm | pdf | https://opsvision.corp.wabtec.com/connect/epm/horizon/viewer/600eb46ad65ea800091d855a?monitor=true |
| | 601d967b26fd0300085ef82d | Quality Week | epm | pdf | https://opsvision.corp.wabtec.com/connect/epm/horizon/viewer/601d967b26fd0300085ef82d?monitor=true |
| | 601d9ccb53733d0008d124f5 | Quality Alert 2/22/21 | epm | pdf | https://opsvision.corp.wabtec.com/connect/epm/horizon/viewer/601d9ccb53733d0008d124f5?monitor=true |
| | 604a392783051300086ea7b | North Gate | epm | pdf | https://opsvision.corp.wabtec.com/connect/epm/horizon/viewer/604a392783051300086ea7b?monitor=true |

FIG. 8

FACILITY CONTROL AND COMMUNICATION SYSTEM

BACKGROUND

Technical Field

The subject matter described relates to communication control systems and methods for providing communications at a facility.

Discussion of Art

As electronic device and communication systems advance, companies are looking for ways to take advantage to provide workers with more information and communication. By providing better communication, productivity can increase, while also making for a more enjoyable work setting. As an example, companies that include on site manufacturing often includes both office space, along with a shop floor where numerous manufacturing work areas are located. For example, the shop floor may include a paint booth, presses, dies, casts, or other manufacturing equipment, shipping departments, welding areas, etc.

With advancements in electronic devices and communication systems, each work area can include their own kiosk, or electronic device that is able to communicate with the other electronic devices in a facility. Currently, to communicate information to these individual devices a master controller is utilized that provides data content for displaying on each screen. Unfortunately, to provide the display data content, the master controller requires custom software that can be expensive, difficult to implement, and difficult to utilize. In addition, while the master controller can provide inputs for each electronic device, there is not a way to provide information about each work area that could be utilized for improving manufacturing.

BRIEF DESCRIPTION

In one or more embodiments, a system is provided that may include plural data collector devices that may be configured to be communicatively coupled with each other in a network. Each of the data collector device may include one or more processors configured to receive display data from one or more data sources. The one or more processors may also be configured to communicate different portions of the display data to different respective network locations in the network. The one or more processors of each of the data collector devices may also be configured to control a respective display device of several display devices to alternate between displaying the different network locations at different times.

In one or more embodiments, a method is provided that may include obtaining display data from data sources at each of plural data collector devices communicatively coupled with each other in a network. The method may also include communicating different portions of the display data from each of the data collector devices to different respective network locations in the network, and directing a respective display device of several display devices from each of the data collector devices to alternate between displaying the different network locations at different times.

In one or more embodiments a system is provided that may include data collector devices that may be configured to be communicatively coupled with each other in a decentralized network. The data collector devices may also be configured to obtain display data from data sources and to communicate different portions of the display data to different respective uniform resource locators in the network. The data collector devices may also be configured to control a respective display device of several display devices to alternate between displaying the different portions of the display data according to which of the uniform resource locators the different portions of the display data were communicated.

BRIEF DESCRIPTION OF THE DRAWINGS

The inventive subject matter may be understood from reading the following description of non-limiting embodiments, with reference to the attached drawings, wherein below:

FIG. 7 illustrates a front plan view of a display screen.

FIG. 8 illustrates a front plan view of a display screen.

DETAILED DESCRIPTION

Embodiments herein relate to a system, and more particularly a communication control system for a facility, such as a factory, that may provide display data to plural display devices in a network. Plural data collector devices each include a processor, one or more sensors, an input device, and/or a related network location. The network location in one example is a webpage (e.g. uniform resource locators (URL)) that can include work related data associated with the location of the individual data collection device in the facility. As an example, in a paint booth, information related to the number of components requiring painting to fill an order can be provided. Such information can be input into the network utilizing the input device at the data collector device associated with the paint booth. In addition, each data collector device can also include one or more sensors related to the location of the data collector device. Such sensors can include temperature sensors, humidity sensors, sound sensors, motion sensors, etc. So, in the example of the paint booth, the temperature and humidity in the area can obtained and communicated to the network location. As a result, an individual at another display device can make a determination if conditions are unsafe, or may cause ineffective painting to take steps to address. In this manner, the network location can be continuously updated with network location specific data that can be stored in a database of a central memory of the network. In particular, the database can store a network location related to each individual data collector device, and present each network location for use by each individual data collector device as plural tabs of individual webpages. A timer can be provided such that each tab is displayed for a determined amount of time before a next tab is shown. The timer, time period for display, order of tabs, etc. can be determined by and inputted by a user at an individual data collector device. Such user specific settings can be stored in the database of the central memory, and communicated to the individual data collector devices for implementing.

Figure 1:
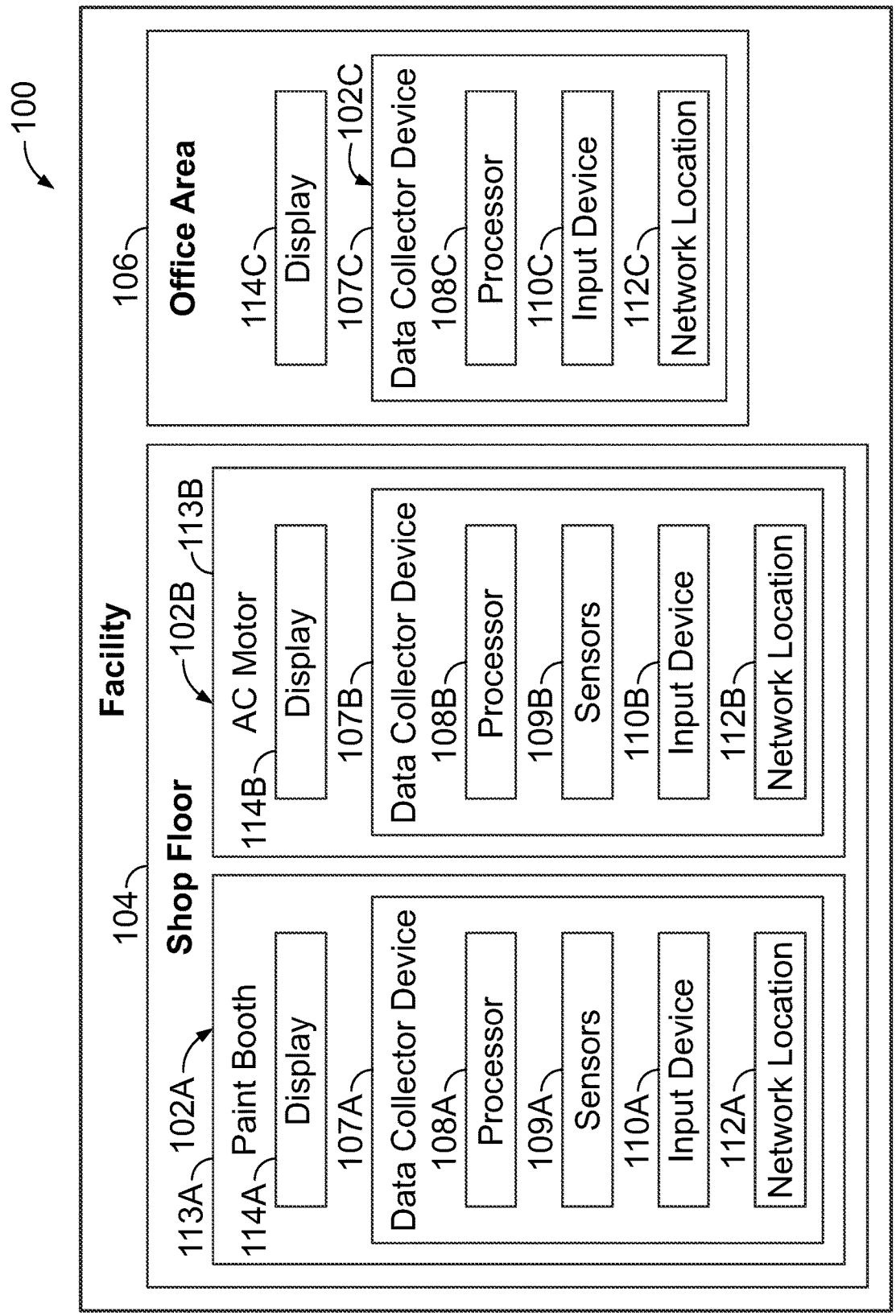
FIG. 1 illustrates a block schematic diagram of an environment that utilizes a communication control system.

FIG. 1 illustrates an environment 100 that utilizes a communication control system (FIG. 2) for obtaining display data, and displaying the display data and information related to different locations 102A-C in the environment. In example embodiments, the environment can be a facility, factory, campus, office building, apartment building, strip mall, etc. Optionally, the environment can include indoor locations, outdoor locations, present more than one building, or the like. In particular, the environment may be determined based on the network of the communication control system, where all devices utilizing the network form a portion of the environment. To this end, the locations may represent different areas of the environment where information can be displayed for a user. In one example, the network may be a decentralized network.

In the example embodiment of FIG. 1, the environment is a facility that may include a shop floor 104, and an office area 106. The first location represents a paint booth, while the second location represents an area for manufacturing an AC motor, and the third location represents an office that in one example can be the office of a manager of the shop floor. In other example embodiments, the locations can represent a grid blower manufacturing area, a rotor manufacturing area, an armature manufacturing area, an alternator/stator manufacturing area, an alternator/rotor manufacturing area, a maintenance area, a shipping area, receiving area, a welding area, press area, a break room area, a cafeteria area, or the like. In particular, depending on the facility, different work areas may be provided where information can be displayed for viewing by workers of the facility.

Figure 3:
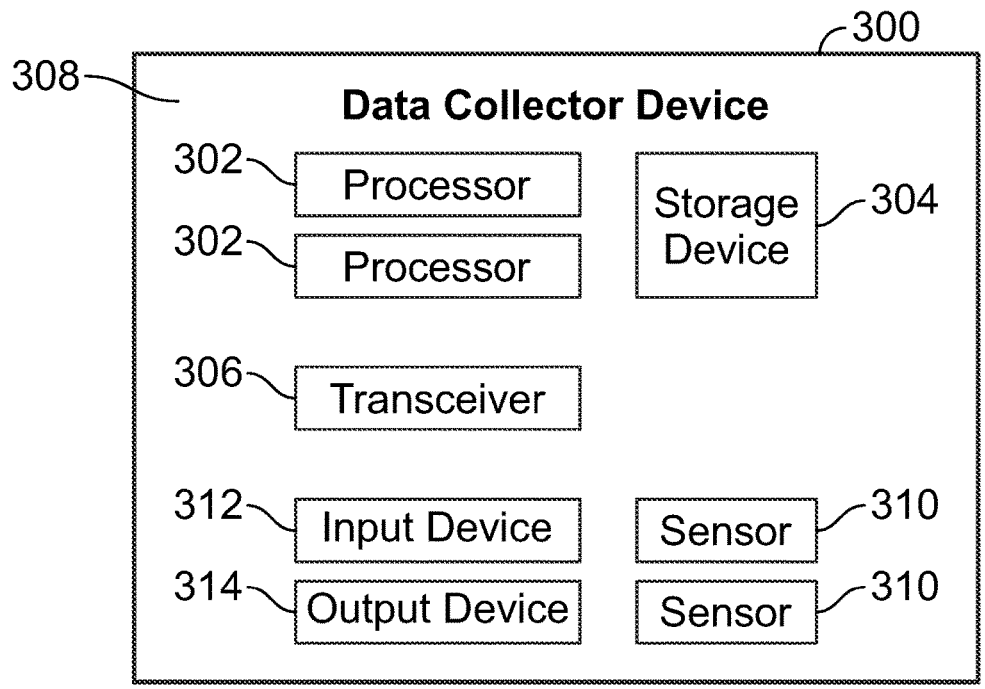
FIG. 3 illustrates a block schematic diagram of a data collector device.

Each location may be represented by and includes a data collector device 107A-C that obtains display data. In particular, in the example of FIG. 1 the first collector device may be in the first location, the second collector device may be in the second location, and the third network collector device may be in the third location. In one example, each data collector device may be a raspberry pi device (FIG. 3). A raspberry pi is a computing device that has a single board that contains a processor, a storage device, at least one input device and at least one output device. The raspberry pi device as used herein is a computing device that has a single board. A raspberry pi device does not have to be manufactured by a specific company or manufacturer. The purpose of the raspberry pi is to provide a simple and inexpensive computing device. To this end, a raspberry pi does not include a display device, keyboard, or other hardware that can add bulk and expense to a computing device. Instead, a raspberry pi device includes input devices such as USB ports, ethernet ports, WiFi communication devices, etc. that allow communication with hardware such as a display device, keyboard, joystick, hand controller, or the like.

To this end, each data collector device can include a processor 108A-C, sensor 109A-B, input device 110A-C, and an associated network location 112A-C. In particular, the sensor and input device represent data sources of the data collector device that obtain display data for communicating through a network. In one example, the sensor may be provided so that information and sensor data can be obtained related to a powered system 113A-B at a corresponding network location, or environment at a network location that can communicated to other users of the network. For example, when the first data collector device may be in a paint booth, the sensor may be a temperature sensor or humidity sensor. The first processor based on signals from the temperature or humidity sensor continuously determine the temperature and/or humidity of the first location. The temperature and humidity data can then be communicated to other data collector devices in the network as display data that may be displayed at different locations. In one example a portion of the display data may be displayed at the different locations. In this manner, if the temperature or humidity are too high and at a level that can cause peeling, poor application, dangerous fumes, etc. another user can observe the temperature humidity data at another data collector device and take immediate remedial actions to stop the manufacturing process, alter the manufacturing process, etc. In example embodiments, the display data may include measured humidity, measured temperature, measured air quality, job statuses, part inventory, etc.

Optionally, the processor may also store display data such temperature and humidity information on a periodic basis (e.g. second by second, minute by minute, hour by hour, etc.) that can be viewed by a user of the data collector device, or of another data collector device at a later time. In one example, a portion of the display data may be selected for viewing by users of other data collector devices. In this manner, if product in the field experiences poor quality, peeling, fast wear, poor aesthetic appearance, or the like, a record of the temperature and humidity may be provided so that determination can be made if such poor quality was a result of the manufacturing process. To this end, sensors can include temperature sensors, humidity sensors, pressure sensors, sound sensors, motion sensors, speed sensors, angular speed sensors, or the like.

In another example, each sensor can provide display data in the form of sensor data about a powered system at the location, including work product related to each powered system at the location, the local environment of the location, etc. Work product can include individual components being manufactured, operations of the powered systems, or the like. The powered systems may include motors, rotors, alternators, stators, armatures, tires, wheels, frames, coils, grid blowers, stators, etc. In this manner, the sensor may be utilized to determine characteristics, parameters, operating conditions, etc. associated with each powered system being manufactured. Again, such sensor data and information can be stored in a memory of the data collector device, or a local memory device (FIG. 2) of the network for review and analysis. Such sensor data and information, and resulting analysis may result in diagnosis of manufacturing deficiencies, inefficiencies, etc. improving the manufacturing process.

The input devices may include communication devices such as input ports (e.g. ethernet ports, USB ports, telephone cable ports, etc.), WiFi devices, or the like that can couple with an external input device. The external input device may be a keyboard, mouse, touchscreen, remote electronic device, etc. that allows a user to communicate display data, information, etc. to the data collector device. The display data or information can include user information, work information including completion of tasks, status of tasks, etc., messages for other users, requests, settings for a displaying information, or the like. In particular, the data collector device may be able to collect display data from one or more sensors, from a user at an external input device, from communications from other collector devices, etc.

The network location in example embodiments may be a webpage, document, pdf, or the like that can be communicated and shared within the network. For example, a network location can be related to a location that may be a specific work area. In one example, when the location is an AC motor preparation or manufacturing area, a network location may be provided that may be related to the AC motor. The network location can include display data including sensor data, input data, data from other data collector devices, or the like. When the network location is updated at a data collector device with the display data the updated network location can be communicated from the data collector device through the network to the other data collector devices in the network. In this manner, work progress may be constantly updated for users of the other data collector devices to receive. To this end, to simplify the display data, a determination may be made to only provide a portion of the display data for displaying on the network location. For example, a sensor may provide sensor data in the form of readings obtained every ten seconds and then average all readings for a previous hour in a first in first out basis. Instead of putting every reading from the previous hour on the network location, only the calculated average over the previous hour may be placed on the display device. In this manner, only a portion of the display data may be displayed on a display device for users of the network to prevent a cluttered display device that may be difficult to understand.

To this end, each data collector device may be coupled to a display device 114A-C. In one example, a display device may be an external input device, including by having a touch screen for inputting information into the corresponding data collector device. Each display device may provide a digital image, analog image, etc. that can include network locations associated with the different data collector devices. Each display device receives the display data, a portion of the display data, etc. and may present an image accordingly on the network location. The image may include numbers, percentages, messages, times, goals, pictures, prompt boxes, scroll down menus, hyperlinks, or the like.

Figure 2:
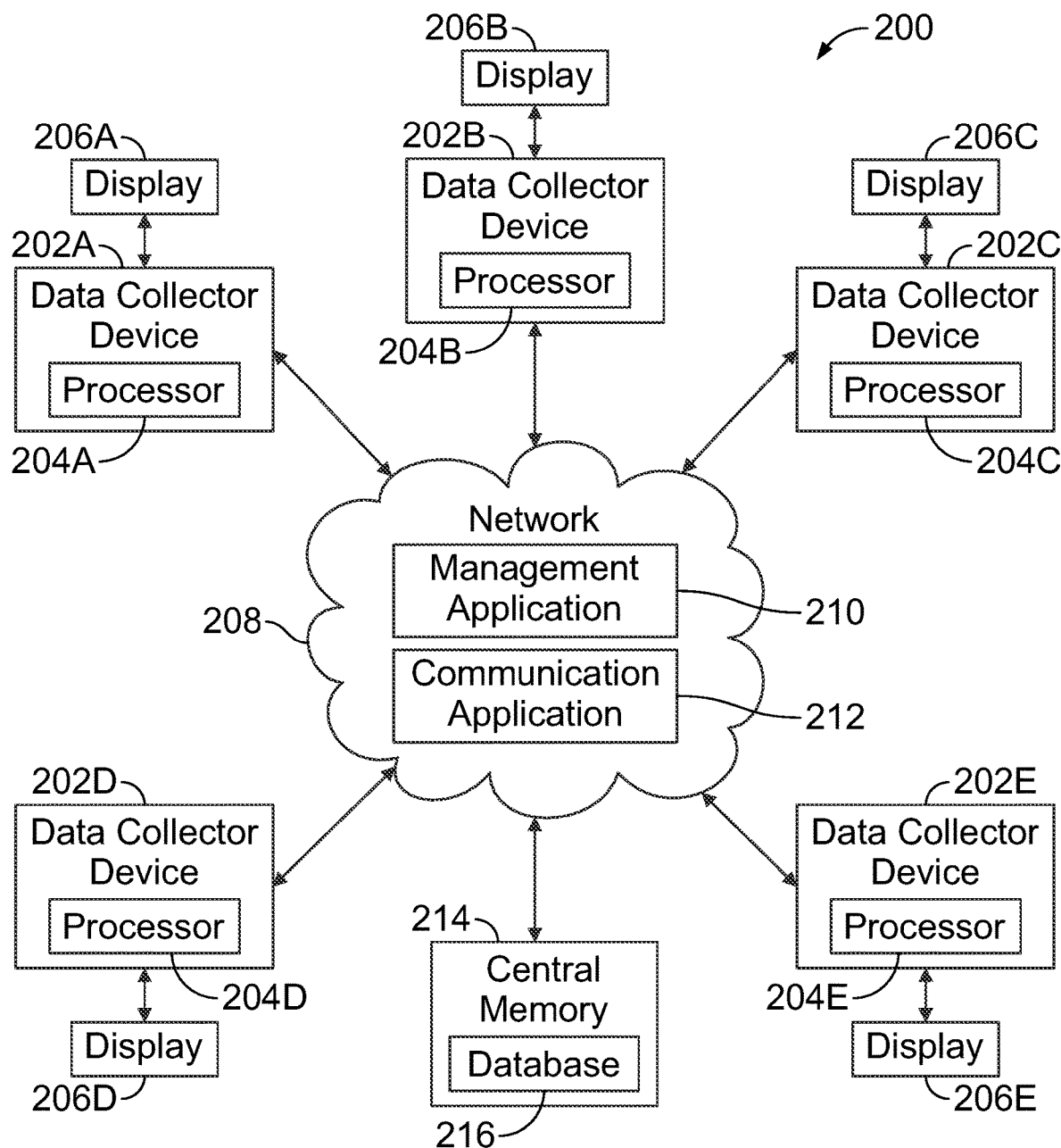
FIG. 2 illustrates a block schematic diagram of a communication control system.

FIG. 2 illustrates a communication control system 200 for an environment. In one example, the environment may be the facility illustrated in FIG. 1. The communication control system 200 includes the data collector devices 202A-E each having their own processor 204A-E. In one example, the data collector devices include the data collector devices illustrated in FIG. 1. To this end, each data collector device can include one or more sensors, an input device, a network location related to each specific data collector device, or the like. Therefore, in one embodiment, each data collector device can be a raspberry pi device, and each network location can be a webpage, URL, different protocol-relative links, etc. Optionally, the network location can be a pdf, document, etc. that can be updated and shared between the data collector devices.

Each data collector device may be coupled to a display device 206A-E. The display device may be located in a location of an environment, or remote to an environment. The display device may be digital, analog, or the like. Each display device may be coupled to a corresponding data collector device via a wire, cord, USB cord, ethernet cord, wirelessly, through the air, via WiFi, or the like.

Each data collector device may be also coupled to a network 208. The network can be wire based, wireless, in the cloud, a local area network (LAN), a wireless local area network (WLAN), or the like. Each data collector device can be coupled via a wire, cord, ethernet cable, USB cable, wirelessly, via WiFi, or the like. Optionally, the data collector devices are communicatively coupled with each other in the network as a decentralized network.

The network in example embodiments may include a management application 210 and communications application 212. Optionally, the management application and/or communications application may be stored remote from the network and communicated to the network. In one example, a server may not be utilized in providing the network, the management application, and the communications application, and instead a cloud environment may be provided.

The management application may include instructions related to updating the network locations based on display data obtained from the individual data collector devices. For example, the management application can receive settings from each of the data collector devices related to timing of presenting the network locations, including time of day for presenting, length of time each network location may be presented on a corresponding display device before a new resource network may be presented, the order in which network locations are presented, or the like. In one example, the management application may include numerous network locations compiled at a single location, website, document, etc. where each individual network location represents a tab. The management application places each tab in an order that can be determined by a user of a display device. In one example, when the display device may be a touch screen, a user may push on a desired tab to open. Alternatively, the management application automatically updates the tab after a predetermined time, such as fifteen seconds, before displaying a new tab.

In one example, a user may determine that an individual display device should begin displaying the network locations at LOAM when a shift begins for the user. In another example, the user may determine the order of the tabs, along with the amount of time before a new tab may be displayed. In one example, a user may set the determined period to ten seconds. In another example, the determined period lasts for longer or shorter depending on the desire of the user. In addition, the user may decide to eliminate network locations the user may not be interested in viewing. To this end, additional network locations may be added into the tabs. Such additional network locations may include a weather based network location that provides the current temperature and hour by hour forecast; sports based network locations such as a sports based website, a sporting event, news based network locations, entertainment based network locations such as a television show; or the like. To this end, each individual network location may be provided an individual time slot for displaying information associated with the network location so that a display device alternates between displaying different network locations at different times. In this manner, each respective display device alternates between network locations for viewing. In addition, a user may eliminate display data from network locations that the user does not want to observe. In this manner, if a user only cares about the percent of completion of an order, the user can select to eliminate sensor data from the network location provided on their display device, resulting in only the portion of display data providing the percent of order completed to be displayed. To this end, the management application determines the portion of the display data related to a network location may be displayed on an individual display device in the network.

The communication application may be configured to receive display data, information, settings changes, etc. from each of the individual data collector devices within the network and communicate such information to a central memory 214 coupled to the network. In one example, the communication application may be middleware that both communicates with the individual data collector devices from time to time, but additionally shares and prompts the central memory for display data and information from time to time. In particular, in one example, each time a data collector device obtains display data from a data source, including sensor data, input data, or the like, the data collector device automatically communicates with the communication application to provide the display data to the central memory. Alternatively, each individual data collector device receives display data over time, and the communication device prompts the data collector device to communicate the collected information from time to time. Optionally, the communication application may provide a determined period, such as one minute, five minutes, etc. when the communication application obtains all display data obtained by the data collector device during that determined period. Thus, while the updating of information may not be as fast, battery life may be saved by only communicating information from time to time instead of continuously. Similarly, the communication application can obtain information from the central memory from time to time, including any updates.

For example, in one example, a sensor of a data collector device continuously obtains temperature data associated with a network location over a weekend when no workers are present at the network location. When a worker starts the data collector device at 8:00 AM on Monday morning, the communication application determines the data collector device may be operating, and obtains settings for the data collector device. Then the communication application may also obtain the temperature data obtained throughout the weekend and provides such readings at the corresponding display device of the data collector device. As a result, in work areas such as a paint booth, determinations may be made if paint has had an opportunity to dry, chemical make ups may have changed, or the like. In this manner the communication application ensures that information may be passed between the central memory and the individual data collector devices to provide the most up to date display data and information for both the central memory and the data collector device.

In another example, a sensor of a data collector device continuously obtains the voltage of a powered system, such as a motor. The communication application may communicate the sensor data every ten minutes to the central memory to update a network location related to the powered system. The communication application may then obtain a portion of the sensor data related to the motor for placing on a network location of another display device in the network.

The central memory includes a database 216. The database maintains each network location, all of the display data obtained by data collector devices, etc. for the network. The database may be accessed by the communication application for updating network locations, and sharing information between the data collector devices.

FIG. 3 illustrates a schematic block diagram of a data collector device 300. The data collector device in one example may be one of the data collector devices illustrated in FIGS. 1 and 2. The data collector device may include one or more processors 302, a storage device 304 such as a memory, and a transceiver 306 located on a single substrate 308. In one example, the substrate may be a circuit board.

The storage device may be on the substrate of the data collector device, or alternatively may be on a separate device that may be communicatively coupled to the data collector device and the one or more processors therein. By "communicatively coupled," it is meant that two devices, systems, subsystems, assemblies, modules, components, and the like, are joined by one or more wired or wireless communication links, such as by one or more conductive (e.g., copper) wires, cables, or buses; wireless networks; fiber optic cables, and the like. The storage device can include a tangible, non-transitory computer-readable storage medium that stores data on a temporary or permanent basis for use by the one or more processors. The memory may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like.

The data collector device may also have at least one sensor 310. In one example, the data collector device includes two or more sensors. The sensors may include temperature sensors, humidity sensors, pressure sensors, sound sensors, motion sensors, speed sensors, angular speed sensors, or the like. The sensors may be located on the substrate, or alternatively, remote from the substrate. In example embodiments at least one sensor may be associated with a powered system. The sensor may be coupled to the powered system, adjacent the powered system, in communication with the powered system, or the like, to detect powered system signals related to a characteristic, parameter, condition, etc. of the powered system that represents the display data. The sensor may detect the characteristic, parameter, condition, etc., and the processor may then determine a characteristic, parameter, condition, or the like of the powered system that represents the display data.

The data collector device may also include at least one input device 312, and at least one output device 314. The input device can include USB ports, ethernet ports, WiFi communication devices, etc. that allow communication with hardware such as a display device, keyboard, joystick, hand controller, or the like. The output device can include USB cables, ethernet cables, telephone wire, or the like that may be hardwired to the substrate to provide a communication pathway.

Figure 4:
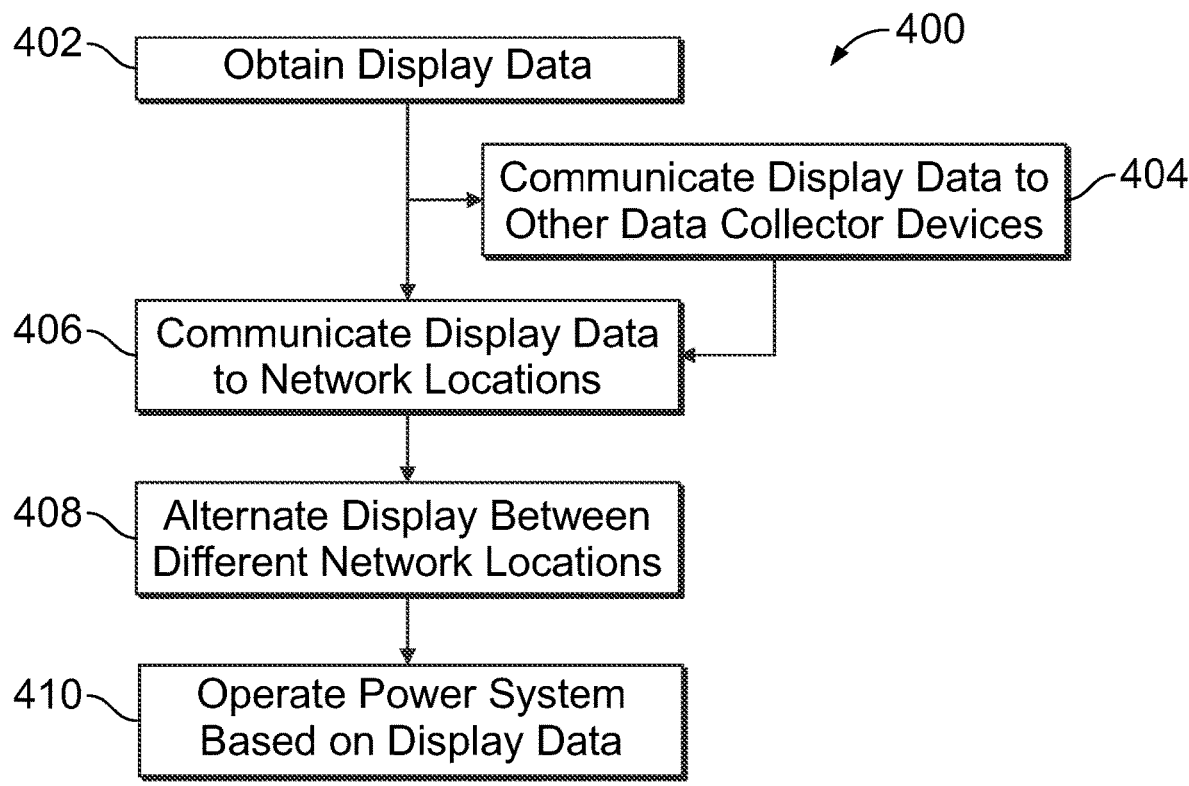
FIG. 4 illustrates a block schematic flow diagram of a process of manufacturing powered systems.

FIG. 4 illustrates a process 400 of manufacturing powered systems that facilitates communication to speed manufacturing time, and reduce manufacturing errors and faults. In one example, the communication control system of FIG. 2 may be utilized to accomplish the process within an environment as illustrated in FIG. 1. In another example, the data collector device of FIG. 3 is utilized to implement the process.

At 402, display data may be obtained from data sources at each of plural data collector devices communicatively coupled with each other in a network. Display data may include readings, sensor data, input data, data from a data source, parameters, conditions, text, messages, or the like. Data sources in example embodiments include sensors that provide sensor data related to a network location, powered system, or the like, display devices that function to allow input data to be manually input into a data collector device through a touch screen, a keyboard, mouse, or other input device that allows input data to be manually input into the data collector device, etc. The plural data collector devices in one example are each a raspberry pi device that includes a processor for determining, communicating, and converting display data to provide images at each display device.

At 404, optionally, at least part of the display data may be communicated between two or more of the data collector devices. In particular, while in one example, display data from two different data collector devices may be communicated through a network, a communication application, a central memory, etc., in other example embodiments, the display data from a first data collector device may be communicated directly to a second data collector device. In this manner, network locations may be updated more frequently, and present more accurate information.

At 406, different portions of the display data from each of the data collector devices are communicated to different respective network locations in the network. For example, each data collector device provides display data in the form of input data, sensor data, etc. obtained by the data collector device. A user of a first display device associated with a first network location may desire to view a first network location for ten seconds, then a second network location for ten seconds, and then a third network location for ten seconds, then the score of a sporting event for ten seconds, and a weather update for ten seconds. Meanwhile, a second user of a second display device associated with a second network location may desire to view a first network location for thirty seconds, a sports score for ten seconds, a second network location for thirty seconds, a weather update for ten seconds, and then a third network location of thirty seconds. In this manner, when each individual display device needs the display data for the network location to be displayed, a communication application may obtain he most up to date display data associated with the selected network location. In one example, a first display device and second display device may receive the same display data at the same overlapping time. Alternatively, in another embodiment, the first display device receives a portion of the display data during a first interval, and the second display device receives the same portion of the display data during a second interval. Optionally, such first interval and second interval may overlap, whereas in alternative embodiments the first interval and second interval do not overlap. In each instance, the communication application obtains the most recently updated display data for displaying on the corresponding network location.

At 408, a respective display device of several display devices from each of the data collector devices may be directed to alternate between displaying different network locations at different times. In one example, a user at a first display device provides settings where each network location can be selected for a specific time slot, and the network locations alternate between the time slots. Therefore, a user may select to place an AC motor network location in the first time slot, an armature network location in a second time slot, a stator network location in a third time slot, a weather update in a fourth time slot, an order update network location in a fifth slot, and a paint booth network location in a sixth time slot. For each network location display data can be provided, including sensor data, input data, or the like. In one example, each network location may be placed on a tab on the display so that a user can manually access a network location if desired. Each specific network location may be displayed for a determined period, such as twenty second, before the next network location may be displayed. Once the six time slots are complete, the display begins over with the first time slot, continuing to alternate between the different network locations at different times. Alternatively, each individual network location can be displayed on the display device simultaneously so that a user can see all of the network locations at the same time.

At 410, a first data collector device of the data collector devices controls, or operates, one or more powered systems based on the display data communicated from a second data collector device of the data collector devices. In one example, a management based processor may monitor sensor data being obtained from sensors of the different data collector devices related to individual powered systems. Based on the sensor data, a threshold may be assigned to the sensor data being obtained such that if the threshold may be exceeded, the management based processor can communicate a signal to an individual powered system to deactivate the powered system, reduce or vary a setting of powered system, or the like. In this manner, remedial action may be undertaken when the sensor data indicate a potential fault or fail operating state. In addition, the management based processor may communicate a message to be presented on a display associated with the second data collector device to provide information to worker of why a change in settings, deactivation, etc. has occurred. Thus, better understanding of operations may be provided, enhancing safety and performance of a working environment.

FIGS. 5-10 illustrate example display screens that may be presented to a worker at a display device. Each display device shows different options, inputs, settings, etc. that may be provided to facilitate and enhance the experience of utilizing the system. In one example, the display device may be any of the display devices of FIGS. 1 and 2. The display device may be communicatively coupled to individual data collector devices to output display data thereon.

Figure 5A:
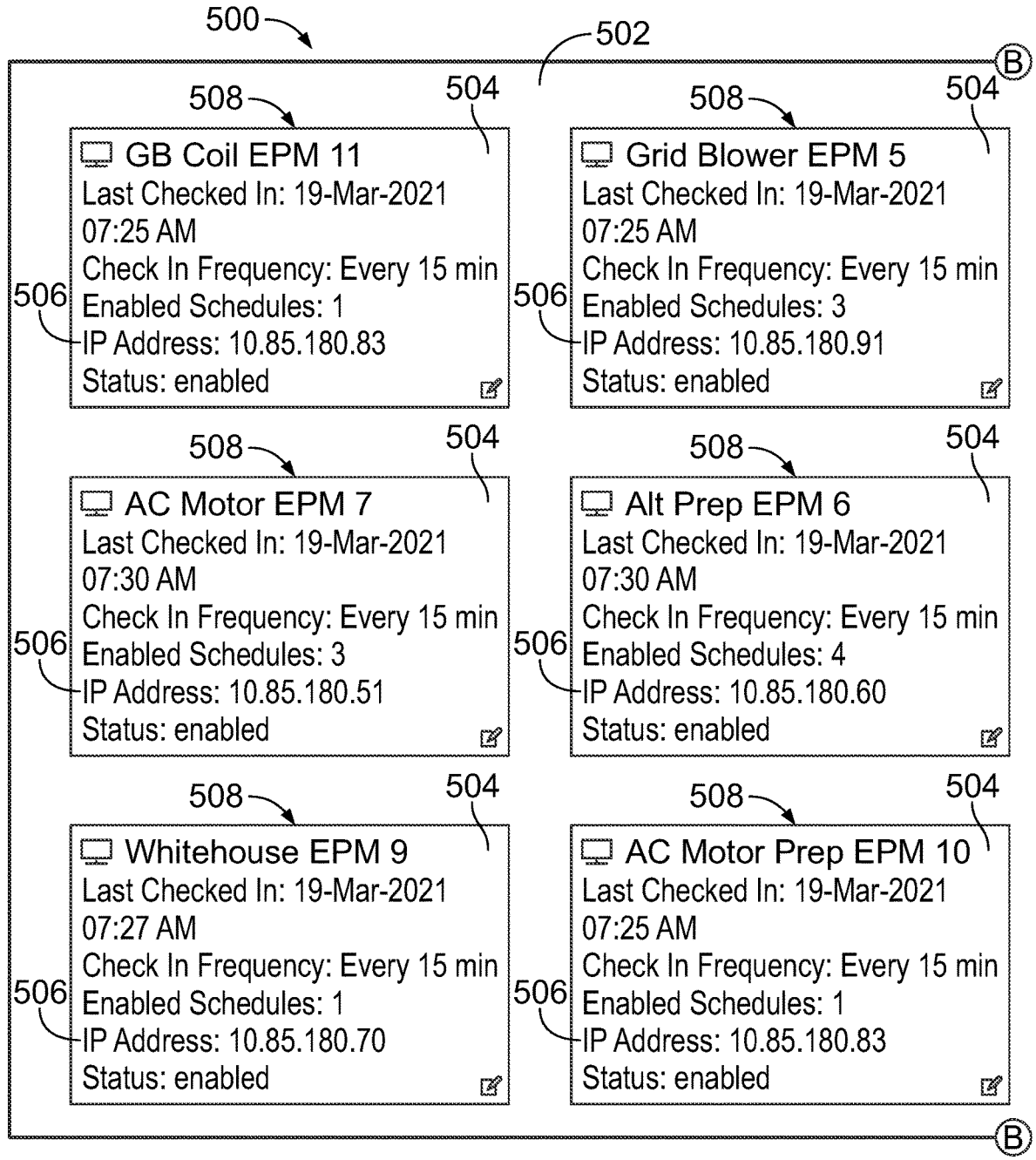
FIG. 5A illustrates a front plan view of a portion of a display screen.
Figure 5B:
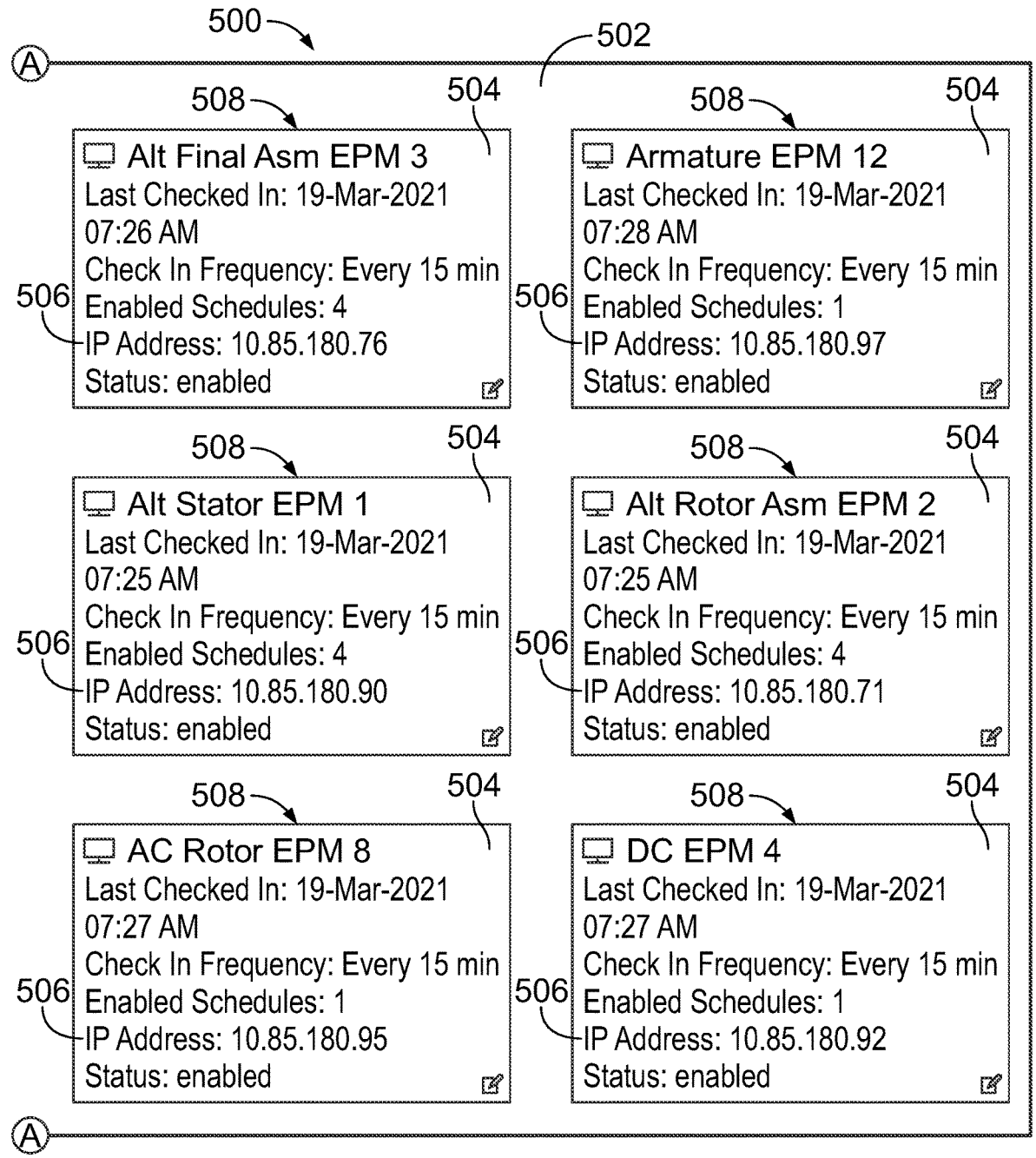
FIG. 5B illustrates a front plan view of the other portion of the display screen from FIG. 5A.

The display device 500 of FIG. 5 illustrates a management display screen 502 that may be provided through a management application. The management display screen includes plural individual screens, or network locations 504 associated with an environment. In one example the environment may be the facility illustrated in FIG. 1. Each network location includes the IP address 506 associated with each data collection device providing the display data for the network location. In addition, settings 508 for each network location can also be provided. Such setting can include how often a data collection device communicates display data to the central memory of the network, status of sensors, the data collector devices, etc., a particular schedule being utilized, the last time display data was received from a data collector device, or the like. In this manner, a user can vary the different setting as desired.

Figure 6:
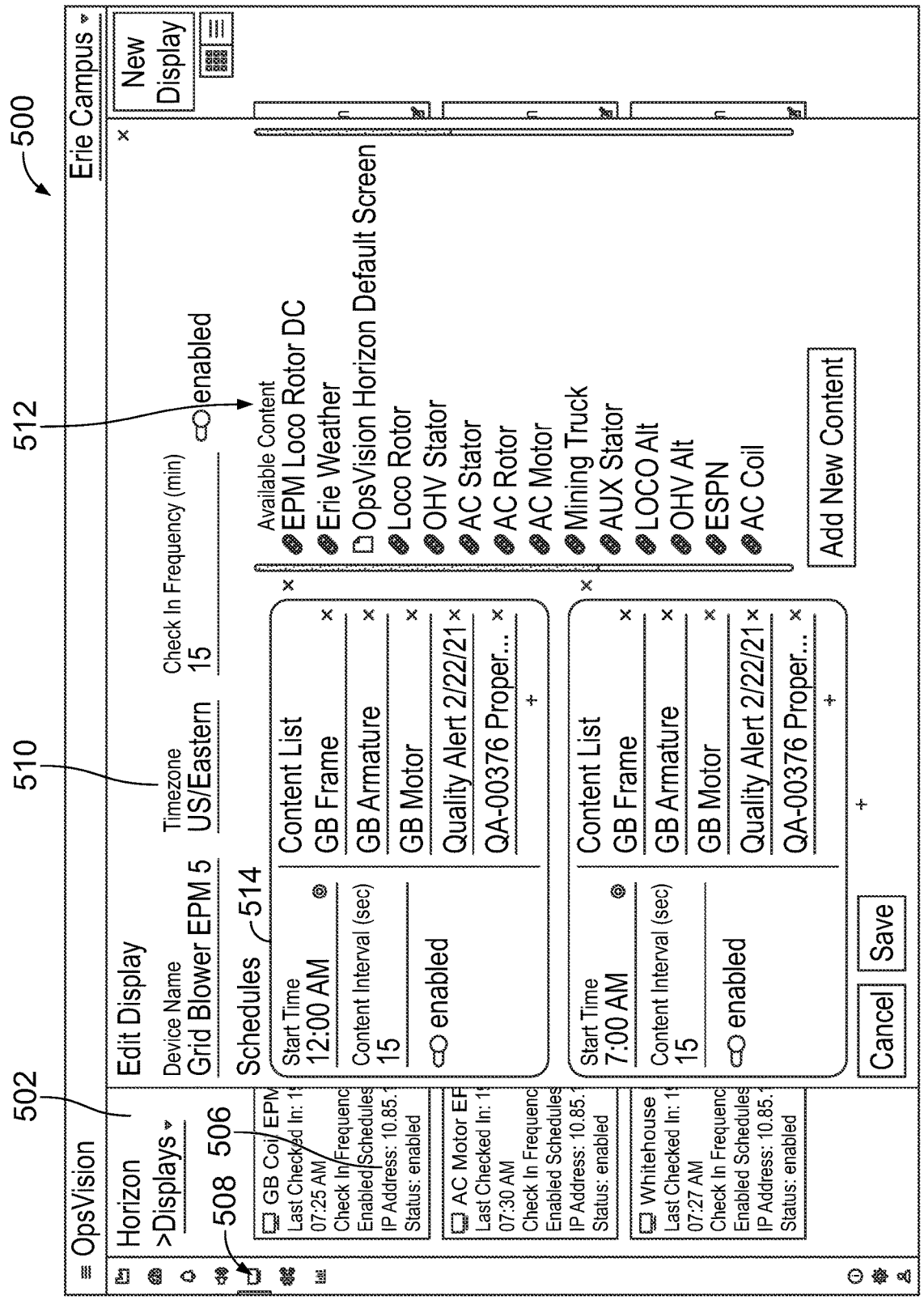
FIG. 6 illustrates a front plan view of a display screen.

FIG. 6 illustrates a manner in which the display device may be varied. In the example embodiment, a prompt window 510 has been accessed by a user. The prompt window may be accessed by pressing a tab on the display screen, through a drop down menu, based on a command such as a right click, based on a voice command, or the like. The prompt window can include a prompt list 512 of all of the different network locations associated with the display screen. When a network location is selected from the prompt list, a settings box 514 may be provided that may allow a user to vary the settings for the specific network location. This includes varying schedules, work orders, starting times, frequency of updates, etc. In this manner, the user can have the display customized to the desires of the user.

Figure 8:
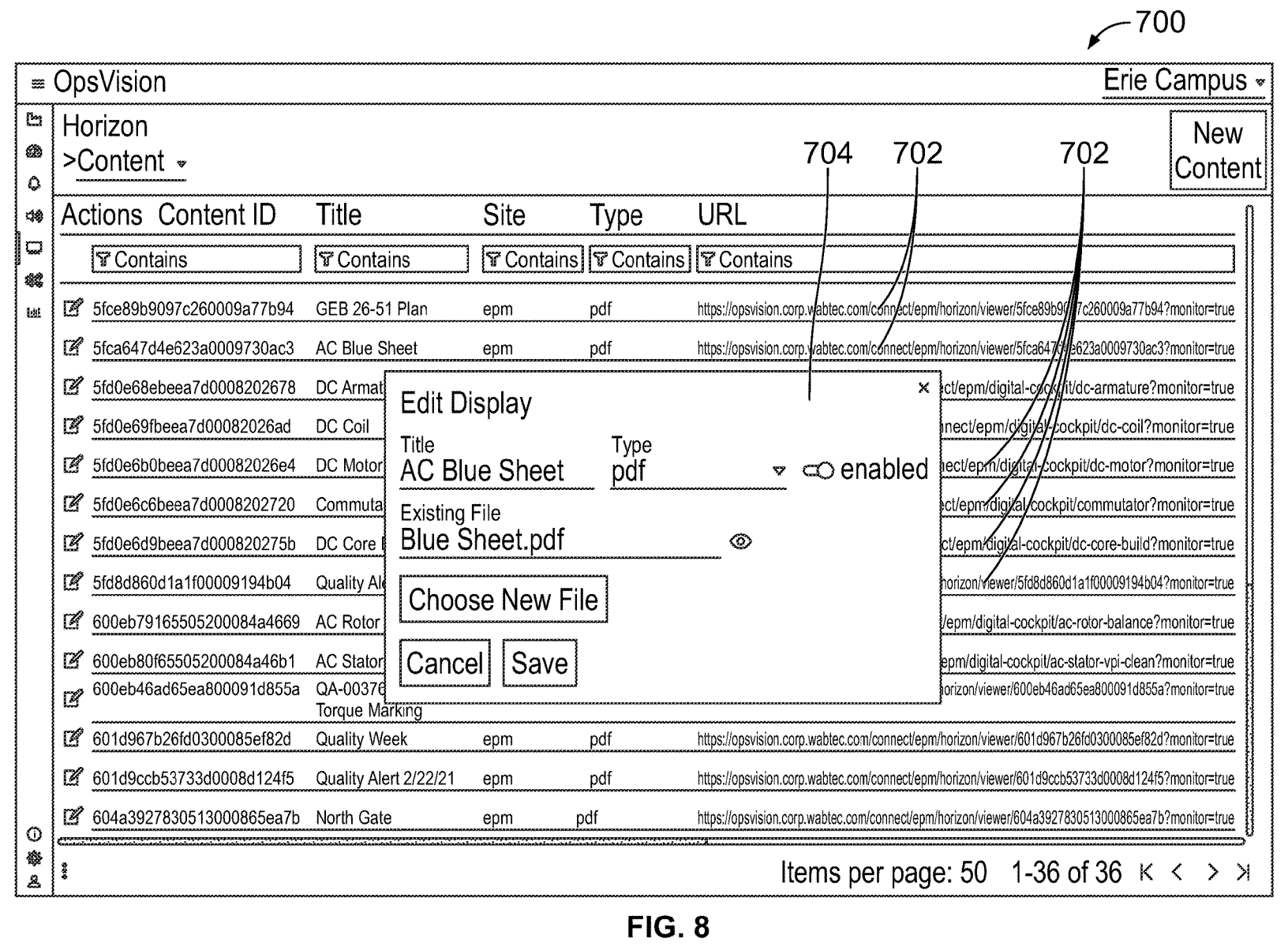

FIGS. 7 and 8 illustrate a display screen 700 that lists all of the different tabs, or network locations 702 to allow for settings related to the network location to be determined. The user can determine to have each individual network location be a pdf, webpage address, etc. In one example, each listed webpage address, URL, different protocol-relative links, etc. and pdf document can have a hyperlink so that a user can link directly to a selected network location by clicking the link. A network location prompt box 704 can then be provided giving a user the choice between how the network location may be provided (pdf, webpage, etc.). As a result, additional individual control may be provided.

Figure 9:
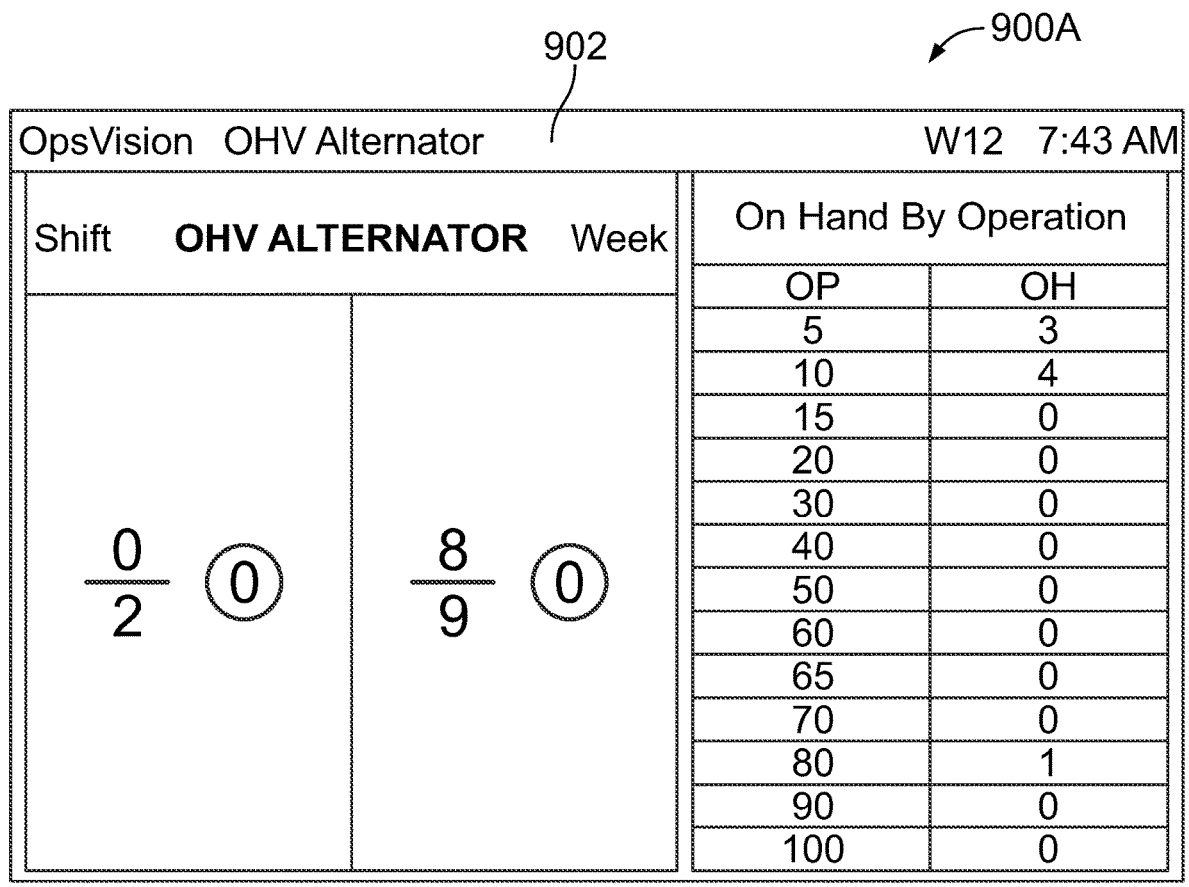
FIG. 9 illustrates a front plan view of a display screen.
Figure 10:
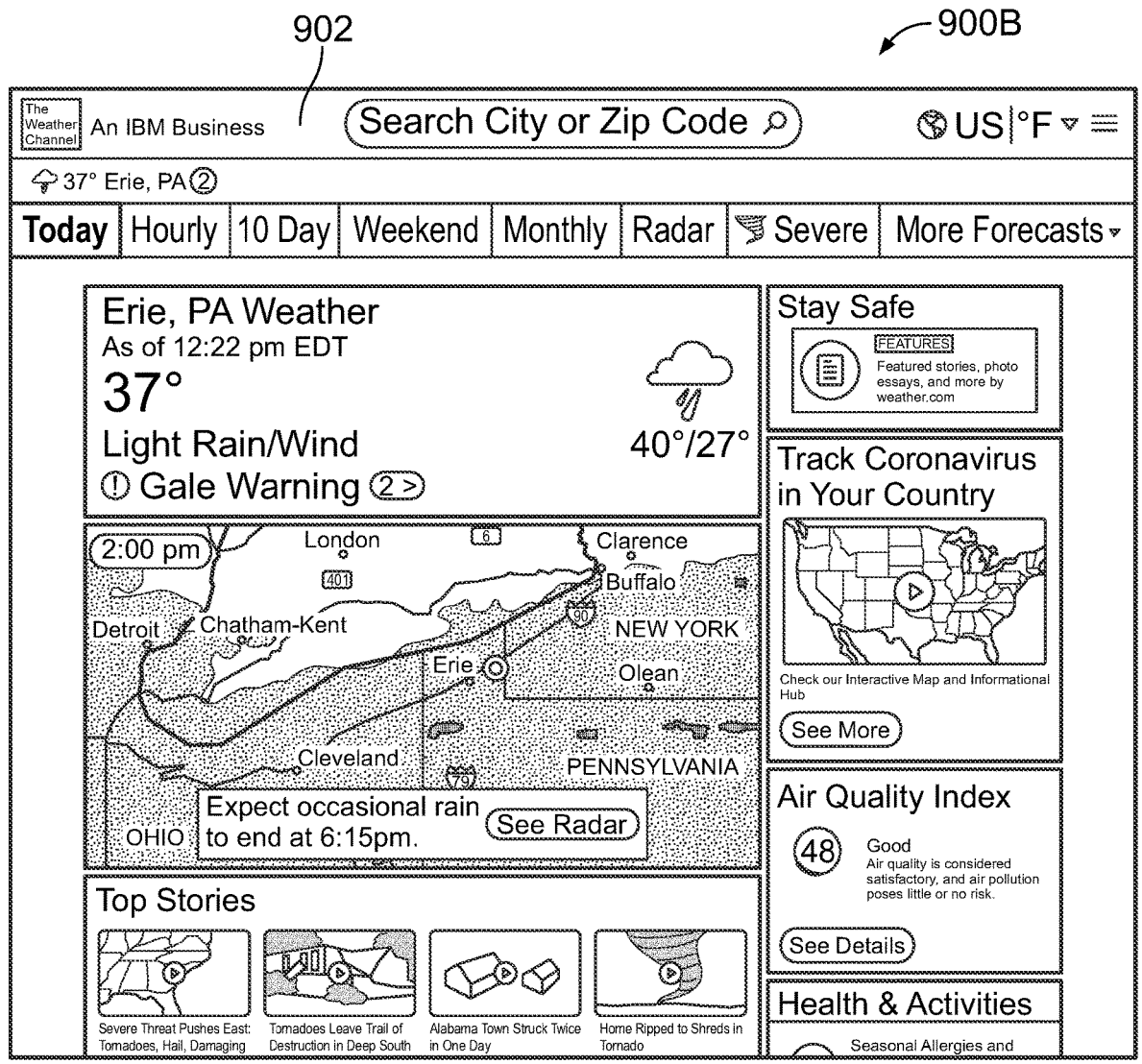
FIG. 10 illustrates a front plan view of a display screen.

FIGS. 9 and 10 illustrate sample network locations 900A, 900B displaying display data on a display device 902. Each network location can be presented as a webpage, pdf, or the like, and may show on the screen for a determined period of time before a next network location may be displayed. In one example, a first network location displays for fifteen seconds before the second network location displays for the next fifteen seconds. As illustrated, the network location of FIG. 9 illustrates display data associated with a work area in a facility. In this example the work area may be an OHV alternator. Display data shown of the display device include the time, shift, week, and information about the current status of the work area. In other example, sensor data, input data, etc. could also be displayed. Such a network resource provides information for other workers, managers, or the like to make decisions and facilitate communication. Meanwhile FIG. 10 shows display data that may be the current weather in an area. This provides addition non-work related information that may be more appeasing for workers, improving the working experience.

In one or more embodiments, a system is provided that may include plural data collector devices that may be configured to be communicatively coupled with each other in a network. Each of the data collector device may include one or more processors configured to receive display data from one or more data sources. The one or more processors may also be configured to communicate different portions of the display data to different respective network locations in the network. The one or more processors of each of the data collector devices may also be configured to control a respective display device of several display devices to alternate between displaying the different network locations at different times.

Optionally, the display data may be received from one or more sensors. In one aspect, the display data may be received from manual input. In another aspect, the display data may be raw sensor data. In one example, the display data that is received may be one or more of aggregated data, analyzed data, modified data, or derived data. In another example, the display data may be a document or a website. In one embodiment, the data collector devices are communicatively coupled with each other in the network as a decentralized network. In another embodiment, the different network locations in the network may be different uniform resource locators or different protocol-relative links.

Optionally, the different portions of the display data may be provided by different ones of the one or more data sources, and the one or more processors of each of the data collector devices may be configured to communicate the different portions of the display data such that the display data provided by each of the one or more data sources may be communicated to a different network location of the network locations. In one aspect, the one or more processors of each of the data collector devices may be configured to communicate the display data to a database and the one or more processors of each of the data collector devices may be configured to obtain the display data from the database. In another aspect, the one or more processors of each of the data collector devices may be configured to communicate the display data to at least one other device of the data collector devices. In one example, the one or more processors of the data collector devices may be configured to control the display devices that are located in different locations within a facility to alternate between displaying the different network locations at the different times. In another example, the one or more processors of the data collector devices may be configured to receive one or more of measured humidity, measured temperature, measured air quality, job statuses, or part inventory as the display data. In one embodiment, the one or more processors of at least a first data collector device of the data collector devices may be configured to control one or more powered systems based on the display data communicated from at least a second data collector device of the data collector devices. In another embodiment, the one or more processors of the data collector devices may be configured to display one or more alert notifications while also displaying the display data.

In one or more embodiments, a method is provided that may include obtaining display data from data sources at each of plural data collector devices communicatively coupled with each other in a network. The method may also include communicating different portions of the display data from each of the data collector devices to different respective network locations in the network, and directing a respective display device of several display devices from each of the data collector devices to alternate between displaying the different network locations at different times.

Optionally, the different network locations in the network may be different uniform resource locators or different protocol-relative links. In one aspect, the different portions of the display data may be provided by different ones of the data sources, and the different portions of the display data may be communicated such that the display data provided by each of the data sources may be communicated to a different network location of the network locations. In another aspect, the method may further include communicating at least part of the display data between two or more of the data collector devices. In one example, the display data may include one or more of measured humidity, measured temperature, measured air quality, job statuses, or part inventory. In another example, the method may also include using a first data collector device of the data collector devices, controlling one or more powered systems based on the display data communicated from at least a second data collector device of the data collector devices.

In one or more embodiments a system is provided that may include data collector devices that may be configured to be communicatively coupled with each other in a decentralized network. The data collector devices may also be configured to obtain display data from data sources and to communicate different portions of the display data to different respective uniform resource locators in the network. The data collector devices may also be configured to control a respective display device of several display devices to alternate between displaying the different portions of the display data according to which of the uniform resource locators the different portions of the display data were communicated.

Optionally, the different portions of the display data may be provided by different ones of the data sources, and the data collector devices may be configured to communicate the different portions of the display data such that the display data provided by each of the data sources may be communicated to a different uniform resource locator of the uniform resource locators. In one aspect, the data collector devices may be configured to communicate the display data between the data collector devices. In another aspect, the data collector devices may be configured to control the display devices that are located in different locations within a facility to alternate between displaying the portions of the display data at the different times. In one example, the display data may include one or more of measured humidity, measured temperature, measured air quality, job statuses, or part inventory. In another example, a first data collector device of the data collector devices may be configured to control one or more powered systems based on the display data communicated from at least a second data collector device of the data collector devices.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   plural data collector devices configured to be communicatively coupled with each other in a network, each of the data collector devices including one or more processors configured to receive display data from one or more data sources and to communicate different portions of the display data to different respective network locations in the network, wherein each of the network locations corresponds to a different data collector device of the data collector devices and includes at least a portion of the display data received by the corresponding data collector device;
   the one or more processors of each of the data collector devices also configured to control a respective display device of several display devices to sequentially display the display data of the different respective network locations at different times according to a predetermined sequence.

2. The system of claim 1, wherein the data collector devices are communicatively coupled with each other in the network as a decentralized network.

3. The system of claim 1, wherein each of the different respective network locations in the network is a webpage of a respective data collector device.

4. The system of claim 1, wherein the different portions of the display data are provided by different ones of the one or more data sources, and the one or more processors of each of the data collector devices are configured to communicate the different portions of the display data such that the display data provided by each of the one or more data sources is communicated to a different network location of the different respective network locations.

5. The system of claim 1, wherein the one or more processors of each of the data collector devices are configured to communicate the display data to a database and the one or more processors of each of the data collector devices is configured to obtain the display data from the database.

6. The system of claim 1, wherein the one or more processors of the data collector devices are configured to control the respective display devices that are located in different locations within a facility to display the different respective network locations at the different times according to the predetermined sequence.

7. The system of claim 1, wherein the one or more processors of the data collector devices are configured to receive one or more of measured humidity, measured temperature, measured air quality, job statuses, or part inventory as the display data.

8. The system of claim 1, wherein the one or more processors of at least a first data collector device of the data collector devices are configured to control one or more powered systems based on the display data communicated from at least a second data collector device of the data collector devices.

9. A method comprising:
   obtaining display data from data sources at each of plural data collector devices communicatively coupled with each other in a network;
   communicating different portions of the display data from each of the data collector devices to different respective network locations in the network, wherein each of the network locations corresponds to a different data collector device of the data collector devices and includes at least a portion of the display data obtained by the corresponding data collector device; and directing a respective display device of several display devices from each of the data collector devices to display the display data of the different respective network locations at different times according to a predetermined sequence.

10. The method of claim 9, wherein the different respective network locations in the network are different uniform resource locators or different protocol-relative links.

11. The method of claim 9, wherein the different portions of the display data are provided by different ones of the data sources, and the different portions of the display data are communicated such that the display data provided by each of the data sources is communicated to a different network location of the different respective network locations.

12. The method of claim 9, further comprising communicating at least part of the display data between two or more of the data collector devices; and simultaneously displaying each of the different respective network locations on the respective display device.

13. The method of claim 9, wherein the display data includes one or more of measured humidity, measured temperature, measured air quality, job statuses, or part inventory.

14. The method of claim 9, further comprising, using a first data collector device of the data collector devices, controlling one or more powered systems based on the display data communicated from at least a second data collector device of the data collector devices.

15. A system comprising:
data collector devices configured to be communicatively coupled with each other in a decentralized network, the data collector devices configured to obtain display data from data sources and to communicate different portions of the display data to different respective uniform resource locators in the network, wherein each of the uniform resource locators corresponds to a different data collector device of the data collector devices and includes at least a portion of the display data obtained by the corresponding data collector device,
the data collector devices also configured to control a respective display device of several display devices to alternate between displaying the different portions of the display data according to which of the different respective uniform resource locators the different portions of the display data was communicated.

16. The system of claim 15, wherein the different portions of the display data are provided by different ones of the data sources, and the data collector devices are configured to communicate the different portions of the display data such that the display data provided by each of the data sources is communicated to a different uniform resource locator of the different respective uniform resource locators.

17. The system of claim 15, wherein the data collector devices are configured to communicate the display data between the data collector devices.

18. The system of claim 15, wherein the data collector devices are configured to control the respective display devices that are located in different locations within a facility to alternate between displaying the portions of the display data at different times based on a predetermined sequence;
wherein each of the portions of the display data is placed in a respective webpage associated with each of the respective uniform resource locators in respective time slots; and wherein to alternate between displaying the different portions of the display data according to which of the different respective uniform resource locators the different portions of the display data was communicated includes utilizing the respective time slots.

19. The system of claim 15, wherein the display data includes one or more of measured humidity, measured temperature, measured air quality, job statuses, or part inventory.

20. The system of claim 15, wherein a first data collector device of the data collector devices is configured to control one or more powered systems based on the display data communicated from at least a second data collector device of the data collector devices.

* * * * *